United States Patent [19]
Stuck et al.

[11] Patent Number: 5,176,068
[45] Date of Patent: Jan. 5, 1993

[54] APPARATUS FOR COOKING WHOLE CHICKENS

[76] Inventors: Robert M. Stuck, 1 Thornwood Rd., Clover, S.C. 29710; Samuel H. Maw, Jr., 1824 Santiago Dr., Newport Beach, Calif. 92660

[21] Appl. No.: 561,187

[22] Filed: Aug. 1, 1990

[51] Int. Cl.⁵ ............................................. A47J 37/04
[52] U.S. Cl. ...................... 99/443; 99/386; 452/183; 452/187
[58] Field of Search ............... 99/360, 362, 386, 389, 99/390, 404, 420, 427, 443 C, 373, 339, 443 R; 198/637, 678.1, 680; 452/167, 177, 183, 187, 188; 219/388, 392, 411; 432/146, 147; 126/41 R, 41 A, 41 C

[56] References Cited

U.S. PATENT DOCUMENTS

| | | |
|---|---|---|
| 2,718,188 | 9/1955 | Read et al. . |
| 2,839,409 | 6/1958 | Matlen . |
| 2,980,544 | 4/1961 | Mills ................... 219/411 X |
| 3,042,186 | 7/1962 | Varney .................. 452/183 X |
| 3,103,694 | 9/1963 | Zebarth et al. ........... 198/680 X |
| 3,166,785 | 1/1965 | Lemmond .................. 452/183 |
| 3,294,011 | 12/1966 | Brunson et al. . |
| 3,380,113 | 4/1968 | Zebarth et al. ............. 452/183 |
| 3,408,057 | 10/1968 | Zebarth et al. ........... 219/388 X |
| 3,416,186 | 12/1968 | Zebarth et al. ........... 198/680 X |
| 3,646,879 | 3/1972 | Palmason et al. . |
| 3,664,257 | 5/1972 | Meyer ................... 99/386 X |
| 3,680,173 | 8/1972 | Martin .................. 198/680 X |
| 3,708,829 | 1/1973 | Klevgard .................. 452/183 |
| 3,751,762 | 8/1973 | Dillon ................... 198/680 X |
| 3,792,508 | 2/1974 | Simonsen et al. . |
| 4,071,924 | 2/1978 | Meyn ................... 198/680 X |
| 4,195,386 | 4/1980 | Dodd ..................... 452/183 |
| 4,228,635 | 10/1980 | Altenpohl et al. . |
| 4,334,464 | 6/1982 | Shinriki ............... 99/450.2 X |
| 4,351,087 | 9/1982 | Altenpohl et al. . |
| 4,366,182 | 12/1982 | Köhler et al. . |
| 4,372,009 | 2/1983 | Linville . |
| 4,413,376 | 11/1983 | Linville . |
| 4,498,578 | 2/1985 | Altenpohl . |
| 4,753,216 | 6/1988 | Nolte . |
| 4,844,930 | 7/1989 | Mottur et al. ............ 99/409 X |
| 5,006,355 | 4/1991 | Stuck et al. ........... 99/443 C X |
| 5,086,694 | 2/1992 | Stuck et al. ............ 99/443 C |

FOREIGN PATENT DOCUMENTS 2025883  1/1980  United Kingdom ............... 198/680

Primary Examiner—Harvey C. Hornsby
Assistant Examiner—C. Cooley
Attorney, Agent, or Firm—Shefte, Pinckney & Sawyer

[57] ABSTRACT

Apparatus for broiling whole chickens which have been severed along the breast bone for opening into a generally flat condition includes a housing having opposing laterally spaced sets of upright gas-fueled infrared heaters defining therebetween a cooking chamber and an endless chain conveyor for transporting chickens suspended by their legs through the chamber. Plural pairs of support forks are spaced along the conveyor for suspending one chicken carcass by its legs from each fork pair with the legs sufficiently spread from each other to maintain the chicken in the opened generally flat condition. A spaced pair of deflector plates are provided along the conveyor following the cooking chamber for discharging both legs of each chicken simultaneously from the pair of support forks suspending the chicken.

4 Claims, 8 Drawing Sheets

APPARATUS FOR COOKING WHOLE CHICKENS

BACKGROUND OF THE INVENTION

The present invention relates generally to apparatus and methods for cooking foods on an automated basis utilizing a conveyor for transporting foods through a heated cooking area. In particular, the present invention relates to such an apparatus and method specifically adapted for broiling whole chickens and other meats.

Over recent years, consumers have become increasingly concerned with fat and cholesterol content of many common and popular foods, particularly meats. As a result, the rate of consumption of leaner types of meats, particularly chicken and other poultry, has been progressively increasing. At the same time, the methods by which meat and other foods are prepared is now viewed as being of equal importance, oil-based frying of foods being disfavored because it substantially increases the fat content of prepared foods while broiling of foods has become increasingly popular since this preparation method involves no addition of fat to the food.

Disadvantageously, however, the increased popularity of broiling as a food preparation method poses several problems for restaurant owners and others involved in commercial and large-scale preparation of foods. One of the most common commercial food broiling systems utilizes a grill suspended over a heat-generating source, typically a gas-fueled burner. During the cooking of virtually any meat on such a broiling apparatus, fat rendered from the meat falls onto the burner producing a considerable amount of smoke, fire and fumes, all of which must be exhausted from the cooking area. In order to do so in many restaurants and other large-scale food preparation operations, it is necessary to maintain high rates of air exhaust from the cooking area, generally through an exhaust flue and filtering arrangement. While a sufficiently high rate of air exhaust is sufficient in most cases to maintain the cooking and serving areas of restaurants and like establishments substantially free of smoke and fumes, the operators of such establishments incur substantially increased equipment and operational expenses for both the exhaust system and for air conditioning and heating the establishment. Further, various Federal, State and/or local laws and regulations prohibit the direct release of the exhausted effluent of the cooking process into the ambient atmosphere. Accordingly, an air filtering arrangement of a capacity suitable to handle air at the prevailing rate of exhaust must be utilized, additionally increasing the cost of operation. Finally, broiling apparatus of this basic type generally require an operator with a reasonably high level of skill and experience to attend the meat being cooked on the apparatus to insure sufficient cooking without overcooking and burning of the meat.

Various types of automated cooking apparatus have been proposed wherein meat is transported by a continuous conveyor system between vertically-oriented opposed facing burners or other cooking elements to reduce the generation of smoke and fumes while at the same time automating the cooking process. Representative examples of such apparatus are disclosed in U.S. Pat. Nos. 2,718,188 to Read et al; 3,646,879 to Palmason et al; 4,366,182 to Köhler et al; and 4,753,216 to Nolte. Of these apparatus, only the Köhler et al patent contemplates use of such an apparatus for cooking whole chickens or other relatively large irregularly-shaped meat items, the apparatus of the other patents being particularly designed and intended for broiling steaks, chops, hamburgers and the like.

One of the most important criteria for the commercial acceptability of any such apparatus is that the meat item must be uniformly cooked over its entire mass. Since many common meat items are typically of a non-uniform thickness and have a non-uniform distribution of fat (with the possible exception of hamburger patties), this criteria is difficult to reliably achieve on a repeatable regular basis in a commercial setting utilizing an apparatus of the type of the above-identified patents wherein substantially the same amount of cooking heat energy is applied by the opposed burners to all exposed surfaces of the meat item without regard to any inherent irregularities in shape, thickness and fat content of the meat.

This problem would be particularly acute in the broiling of whole chickens as contemplated in the Köhler patent due to the irregular shape of chickens and the irregular distribution of fat, which is concentrated under the skin of the chicken in the region of the thighs and back. In this respect, conventional grill-type broiling apparatus have a notable advantage over conveyorized apparatus of the type of the above-identified patents in that a skilled attendant can regulate the uniformity of cooking of meat items by continuously turning the meat items and changing their position on the grill.

An additional problem to be addressed in an automated conveyorized cooking apparatus of the general type disclosed in the above-identified patents is how to mount the meat or other food item being cooked to the conveyor apparatus so as to securely support the food products against undesired movement relative to the conveyor apparatus while also facilitating easy removal therefrom at the completion of the cooking process. Ideally, a cooking apparatus of this type should be equipped with an automated removal device or mechanism to avoid the necessity of utilizing an operator to monitor the apparatus and manually remove cooked food products from the conveyor apparatus. In the Köhler et al patent, whole chickens are mounted on vertical spits on the conveyor apparatus, requiring that the chickens be manually removed by an attendant. The apparatus of the other identified patents are neither designed nor intended for cooking chickens or other poultry so that these apparatus provide no teaching or suggestion for achieving the foregoing objectives in an automated cooking apparatus designed for chickens and other poultry.

SUMMARY OF THE INVENTION

It is accordingly an object of the present invention to provide an improved apparatus and method for broiled cooking of whole chickens and other poultry on an automated conveyorized basis. A particular object of the present invention is to provide a novel conveyor arrangement for reliably supporting whole chicken carcasses in an open generally flat condition to facilitate cooking uniformity. A further object of the present invention is to provide a reliable arrangement for automatically removing cooked chicken carcasses from the conveyor arrangement at the completion of the cooking process.

The present invention contemplates the preliminary preparation of whole chicken carcasses for cooking by severing each carcass along its breast bone and opening the carcass into a generally flat condition wherein its internal chest and abdominal cavity forms one side of the chicken carcass and its breast, back, wings, thighs and legs form the opposite side of the chicken carcass.

Briefly summarized, the cooking apparatus of the present invention basically comprises an arrangement for generating cooking energy utilizing a pair of energy-emitting faces spaced from one another in generally upright laterally-opposed facing relation for defining therebetween a cooking area and an endless conveyor for transporting whole chicken carcasses individually along a cooking path through the cooking area between the energy-emitting faces. According to the present invention, the conveyor has a plurality of support members spaced therealong, each of which is configured for suspending one chicken leg therefrom. Each such support member is sufficiently spaced from another such support member for cooperatively suspending a whole chicken carcass by its legs with the legs sufficiently spread from one another to maintain the chicken carcass opened in its afore-described generally flat condition.

As will be understood, each leg of each chicken carcass has a free end terminating at a knuckle which is relatively enlarged with respect to the adjacent portion of the chicken leg. Accordingly, each support member of the conveyor is preferably configured to engage a chicken leg at the portion thereof adjacent its terminal end knuckle. In the preferred embodiment, each support member is generally of a fork shape having a laterally-spaced pair of prongs for receiving therebetween the portion of a chicken leg adjacent its terminal end knuckle with the knuckle resting on the prongs.

A suitable arrangement is provided in association with the conveyor at an exit end of the generating arrangement for automatically removing each chicken carcass from the spaced pair of support members from which the chicken carcass is suspended, preferably by simultaneously deflecting each leg of each chicken carcass outwardly from the prongs of the support member from which the leg is suspended. In the preferred embodiment, a pair of defector plates are stationarily arranged adjacent the conveyor at a spacing therealong corresponding to the spacing between a spaced pair of the support members. The prongs of the leading support member of each spaced pair of support members extend outwardly from the conveyor to a greater extent than the prongs of the other trailing support member of each spaced pair of support members. The first deflector plate along the direction of travel of the conveyor is accordingly arranged to deflect a chicken leg on each leading support member only partially outwardly with respect to the longer prongs thereof and to deflect a chicken leg on each trailing support member fully outwardly from its shorter prongs. The second deflector plate along the direction of travel of the conveyor is arranged to deflect a chicken leg on each leading support member fully outwardly from its longer prongs.

It is preferred that the prongs of each support member have a covering of material which resists sticking of chicken skin thereto during cooking. Preferably, the covering is in the form of a sleeve of a stick-resistant plastic material fitted on each prong in a manner which enables the covering to be selectively removable and replaced when necessary.

DESCRIPTION OF THE PREFERRED EMBODIMENT

Figure 1:
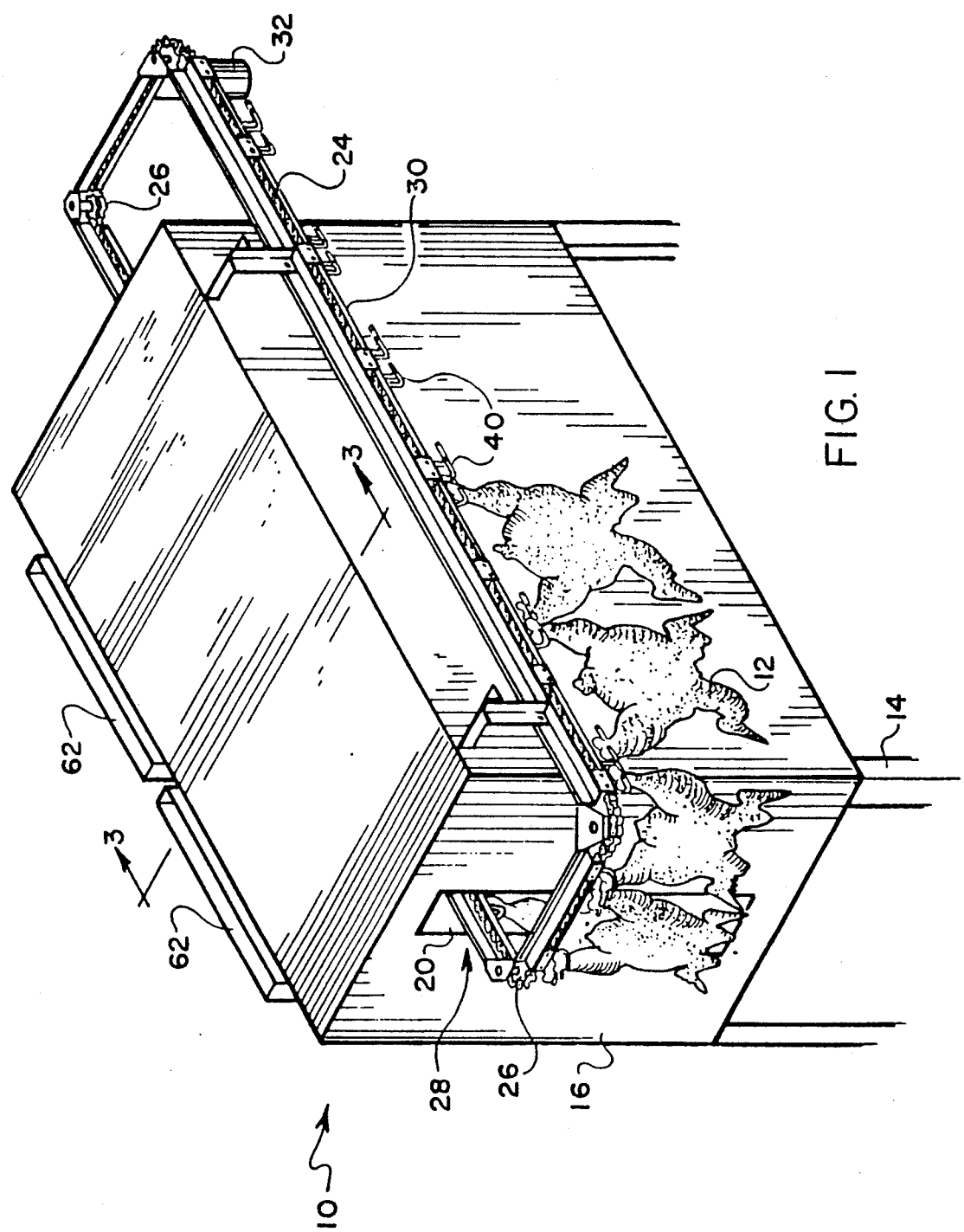
FIG. 1 is a perspective view of a cooking apparatus according to the preferred embodiment of the present invention, taken from one end of the apparatus.
Figure 2:
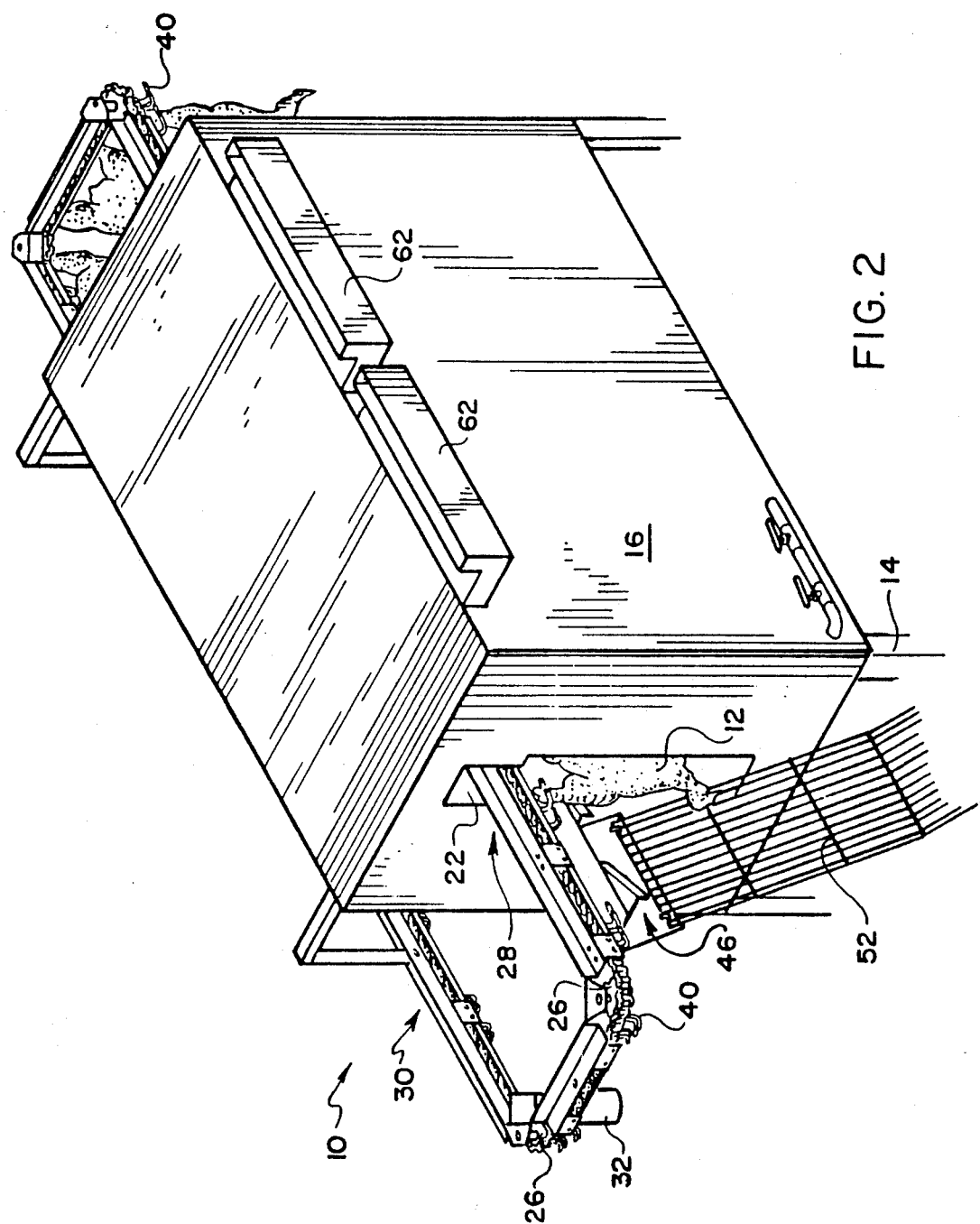
FIG. 2 is another perspective view of the cooking apparatus of FIG. 1, taken from the opposite end of the apparatus.

Referring now to the accompanying drawings and initially to FIGS. 1 and 2, the cooking apparatus of the present invention is indicated generally at 10 in an embodiment thereof preferred for automated broiling of whole chicken carcasses 12 on a continuous basis in a commercial restaurant setting. However, those persons skilled in the art will readily recognize and understand that the present cooking apparatus and the cooking method performed thereby are susceptible of various other specific embodiments, e.g., for automated continuous broiling or other cooking of various other food products, all of which are intended to be within the scope and substance of the present invention.

As best seen in FIGS. 1 and 2, the present cooking apparatus 10 includes a floor-standing frame 14 which supports an insulated housing 16 defining an interior cooking chamber 18 (FIG. 3) generally in the form of a tunnel extending lengthwise the full length of the housing 16 from an entry opening 20 at one end of the housing 16 to an exit opening 22 at the opposite end of the housing 16. An endless chain-type conveyor 24 is trained about a plurality of sprockets 26 rotatably supported by the housing 16 for traveling movement of the conveyor 24 along an operative cooking run 28 extending lengthwise through the housing 16 generally centrally of the cooking chamber 18 at the upper limit thereof and a return run 30 also extending lengthwise of the housing 16 but outside thereof in the opposite direction. One of the sprockets 26 is operatively driven by a variable speed electric drive motor 32 while the remaining sprockets 26 are mounted for free rotation as idler sprockets.

Figure 3:
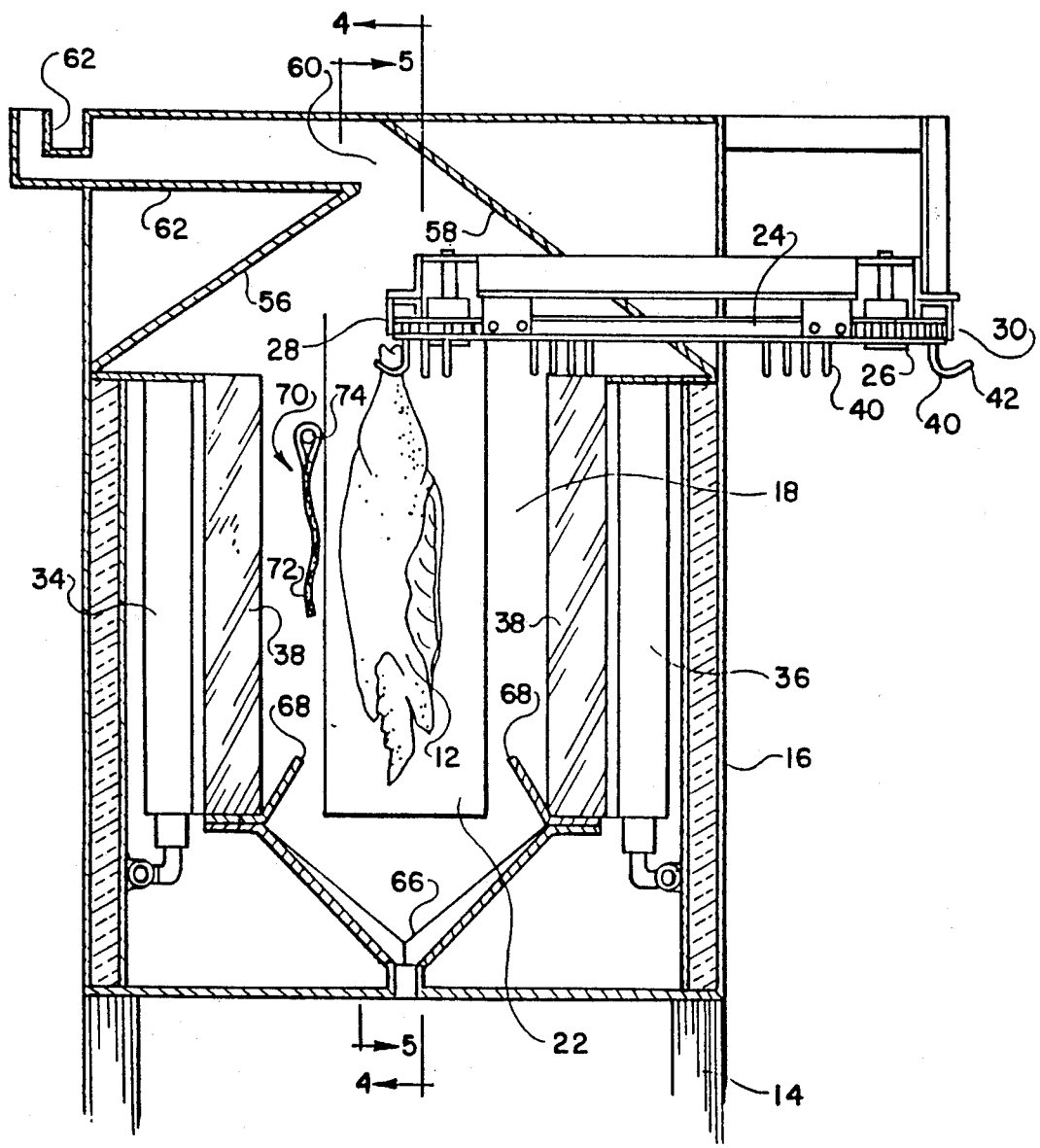
FIG. 3 is an end elevational view, partially in vertical cross-section, of the cooking apparatus of FIG. 1, taken along line 3—3 thereof.
Figure 4:
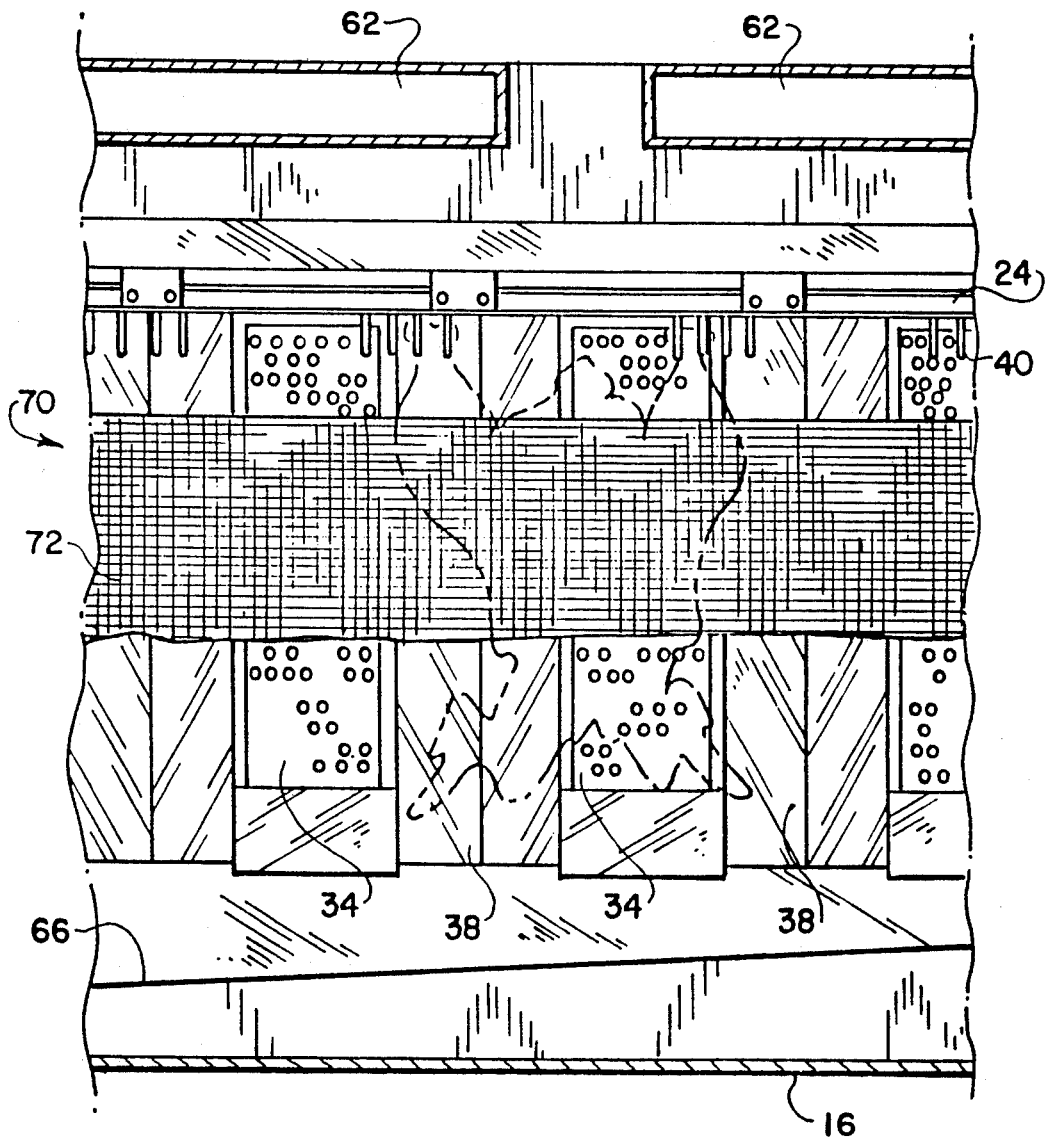
FIG. 4 is a vertical cross-sectional view of the cooking apparatus of FIG. 1, taken lengthwise thereof along line 4—4 of FIG. 3.
Figure 5:
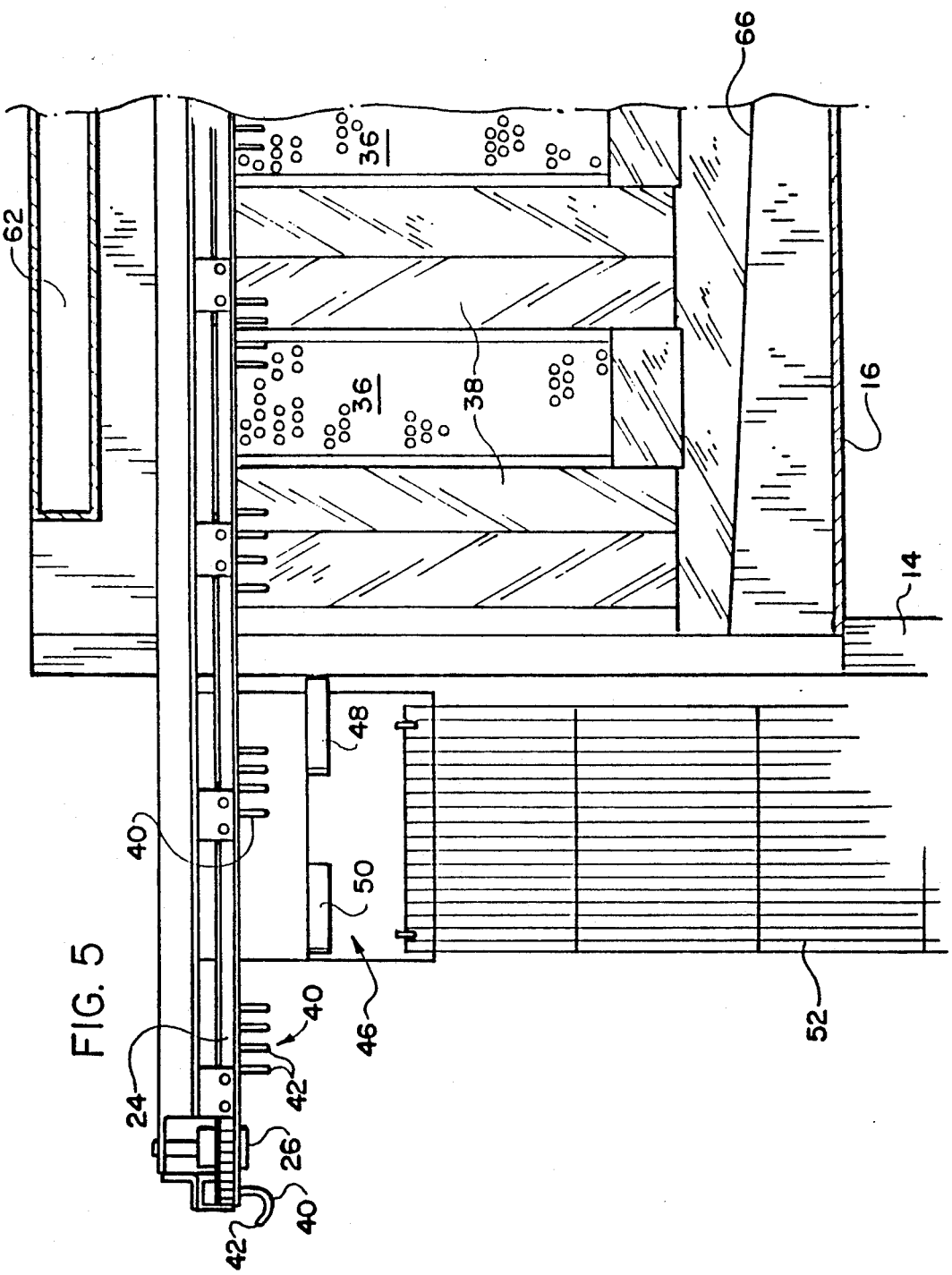
FIG. 5 is another vertical cross-sectional view of the cooking apparatus of FIG. 1, also taken lengthwise thereof along line 5—5 of FIG. 3.

A cooking arrangement is mounted within the housing 16 to generate cooking energy within the cooking chamber 18, the cooking arrangement basically presenting a pair of energy-emitting faces spaced from one another in generally upright laterally-opposed facing relation at opposite sides of the operative run 28 of the conveyor 24 thereby to define the opposite lateral limits of the cooking chamber 18. In the preferred embodiment as illustrated in FIGS. 3-5, the cooking arrangement includes a first plurality of heater panels 34 arranged in generally co-planar laterally-spaced alignment with one another along one side of the cooking chamber 18 and a like plurality of heater panels 36 similarly arranged in laterally-spaced co-planar alignment with one another at the opposite side of the cooking chamber 18. The heater panels 34,36 are of the conventional type having a body of glass-covered ceramic-like material forming the outer face of the panel with a plurality of small orifices being formed in the ceramic body for delivering a mixture of a gaseous fuel, e.g., natural gas, and air for burning at the outer surface or face of the ceramic body.

In this manner, the heater panels 34,36 emit infrared radiation toward one another to heat and cook food products transported through the cooking chamber 18 predominantly by radiant energy but importantly the heater panels 34,36 do not correspondingly elevate the temperature of air within the cooking chamber 18. To enhance this effect, the opposed sets of heater panels 34,36 are arranged in staggered relationship to one another, i.e., each heater panel 34,36 is situated to directly face the abutting frame margins of a pair of the opposing heater panels 34,36 and, further, a generally V-shaped metal reflector plate 38 is disposed along the full extent of the adjacent margins of each adjacent pair of heater panels 34,36 to extend therefrom toward the opposite side of the cooking chamber 18. In this manner, the radiant heat energy emitted by the heater panels 34,36, which otherwise would be substantially absorbed by the frame margins of the opposing heater panels 36,34, is at least partially reflected back toward the central area of the cooking chamber 18.

In the preferred embodiment illustrated, the cooking apparatus 10 is particularly adapted for broiling whole chickens which, after slaughter and evisceration, have been severed along the breast bone and opened into a generally flat condition wherein the rib cage and the other internal portions of the chicken carcass bordering its chest and abdominal cavity form one side of the chicken carcass while the meat portion of the chicken carcass, namely, its breast, back, wings, thighs and legs, form the opposite side of the chicken carcass. Such a chicken carcass is shown at 12 in FIG. 1. It is already known to broil whole chicken carcasses in this opened generally flat condition on a conventional gas-fired grilling apparatus.

Figure 8:
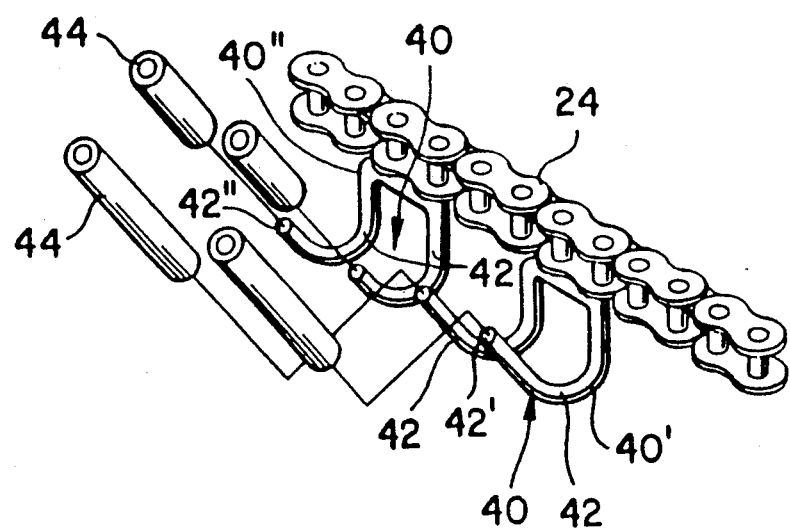
FIG. 8 is a perspective view of a partial length of the conveyor, showing the forks which support chickens thereon.

To facilitate transportation of chicken carcasses 12 in the same opened generally flat condition through the cooking chamber 18 of the present cooking apparatus 10, a plurality of support forks 40 are rigidly affixed to the chain conveyor 24 at spacings along its length for suspending the chicken carcasses 12 by their legs. Specifically, as best seen in FIG. 8, each support fork 40 has a pair of arcuate prongs 42 laterally spaced from one another by a dimension smaller than the typical cross-sectional size of the endmost leg knuckle of a mature chicken yet larger than the cross-sectional size of the narrower adjacent extent of a typical mature chicken leg. The outermost ends of each pair of prongs 42 are unconnected to one another. Thus, a chicken leg may be readily supported by the prongs 42 of each support fork 40 simply by inserting the narrowest portion of the chicken leg between the free ends of the prongs 42 with the endmost knuckle of the chicken leg above the prongs 42 to rest thereon whereby the leg extends downwardly from the fork 40 in depending fashion. The support forks 40 are arranged in pairs along the chain conveyor 24, the individual forks 40 of each pair being spaced from one another by a sufficient dimension to receive the two legs of a prepared chicken carcass when the legs are spread sufficiently from one another to open the carcass into its substantially flat condition as afore-described.

Preferably, the forks 40 are fabricated of metal to provide sturdiness and to resist thermal damage from continuous heating within the cooking chamber 18. However, because the metal material will naturally absorb heat during travel through the cooking chamber 18, bare metal forks 40 will tend to sear the skin of a chicken leg at the points of engagement therewith typically causing the skin to stick to the prongs 42, which makes it difficult to reliably remove the cooked chicken carcasses from the forks 40 without tearing or damaging the skin of the chicken legs. To prevent this occurrence, each prong 42 of each support fork 40 is fitted with an outer sleeve 44 of a stick-resistant plastic material such as Teflon brand tetrafluoroethylene fluorocarbon resin. Such material is commercially available in continuous tubular form and, therefore, may be cut to a desirable length which will readily slide onto a bare prong 42 after heating thereof during travel through the cooking chamber 18. The heat of the prong 42 effectively adheres the plastic sleeve 44 thereto. The arcuate shape of each prong 42 allows the tubular sleeve 44 to conform to the same curvature without the undesirable formation of folds or wrinkles in the plastic sleeve 44. Advantageously, if the protective sleeve 44 becomes cut or otherwise damaged during ongoing operation of the cooking apparatus 10, the sleeve 44 may be readily removed from its prong 42 using a knife or other common cutting tool and quickly replaced with another length of the plastic tubing.

Figure 6:
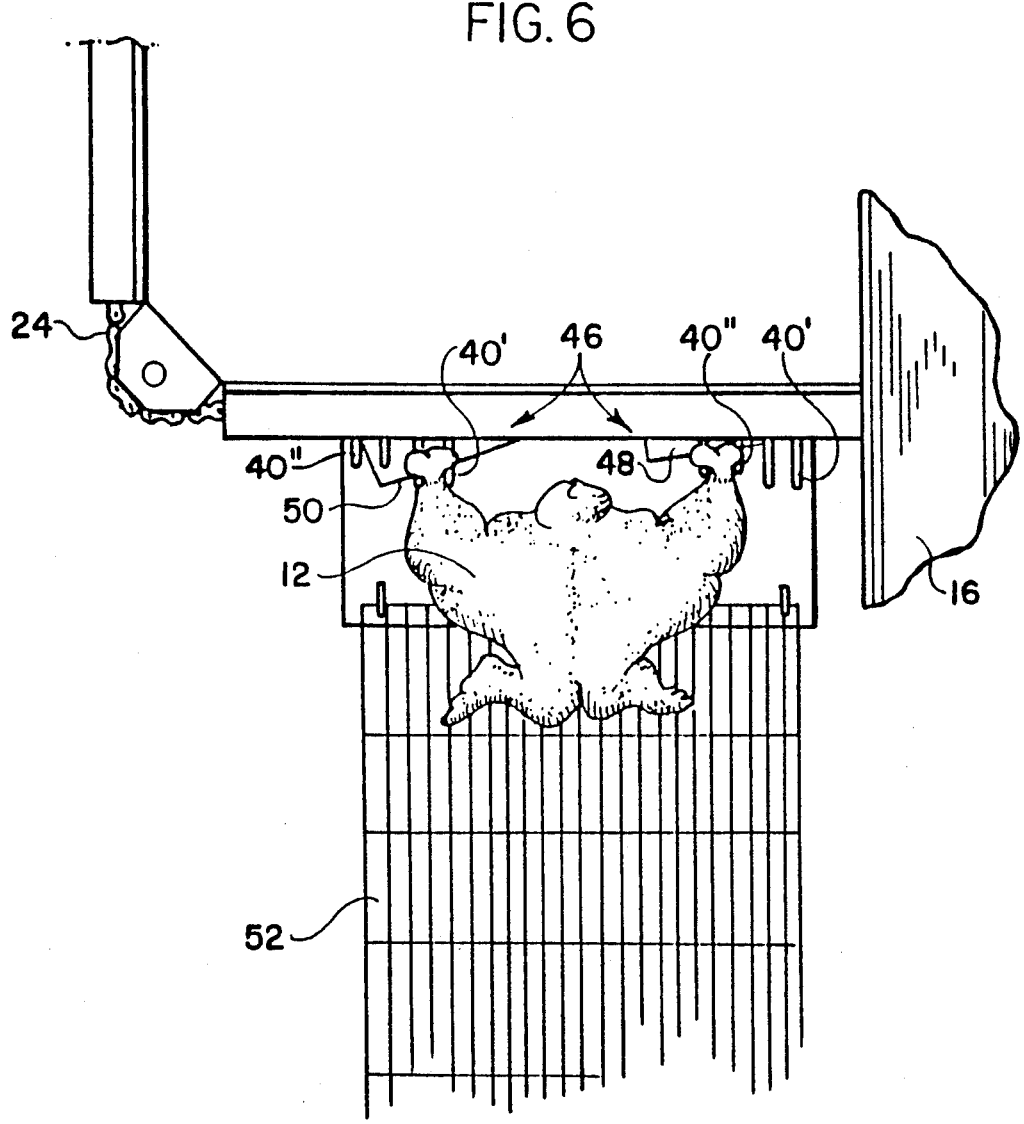
FIG. 6 is a top plan view of the deflector arrangement of the cooking apparatus for removing chickens from the conveyor.

At the exit end of the housing 16, a discharge arrangement, generally indicated at 46 in FIGS. 2 and 6, is mounted in association with the conveyor 24 outwardly of the housing 16 for automatically removing cooked chickens from the support forks 40 of the conveyor 24. As will be understood, after being fully cooked during travel through the cooking chamber 18, the meat of the chickens 12 becomes tender and the joints of the skeletal structure of the chicken become substantially weakened. Accordingly, it is important to simultaneously discharge both legs of a chicken carcass from the pair of forks 40 on which it is supported to avoid possible tearing or separation of the main body of the chicken carcass from one leg which may tend to occur if the full weight of the chicken carcass is supported from only the one leg.

For this purpose, the respective prongs 42 of the support forks 40 of each associated pair are of differing lengths, the prongs 42' of the leading fork 40' of each pair being slightly longer than the prongs 42" of the trailing fork 40" of each associated pair thereof. The discharge arrangement 46 includes a pair of deflector plates 48,50 mounted directly beneath the terminal extent of the operative run 28 of the conveyor 24 immediately outside the exit opening 22 of the housing 16. The deflector plates 48,50 are spaced from one another by substantially the same dimension as the spacing between the support forks 40 of each associated pair thereof. Each deflector plate 48,50 extends at an angle outwardly with respect to the conveyor 24 in the same direction as the prongs 42 extend from the conveyor 24, the first deflector plate 48 in the direction of traveling movement of the conveyor 24 having a lesser outwardly projecting extent than the following deflector plate 50. The angular extension of the deflector plate 48 is selected to be sufficient to discharge a chicken leg from each support fork 40" having shorter prongs 42", but only to move the chicken leg on each support fork 40' having longer prongs 42' outwardly to the terminal extent of the longer prongs 42' without actually discharging the leg from the longer prongs 42'. The greater angular extent of the following deflector plate 50 is selected to be sufficient to subsequently fully discharge a chicken leg from each support fork 40' having longer prongs 42'. Thus, as each associated pair of support forks 40 pass the deflector plates 48,50, he two legs of the chicken 12 supported thereby are simultaneously discharged by the deflector plates 48,50. A wire chute 52 is disposed directly beneath the deflector plates 48,50 and extends downwardly therefrom to a collection basket (not shown) for receiving each discharged chicken 12.

Figure 7:
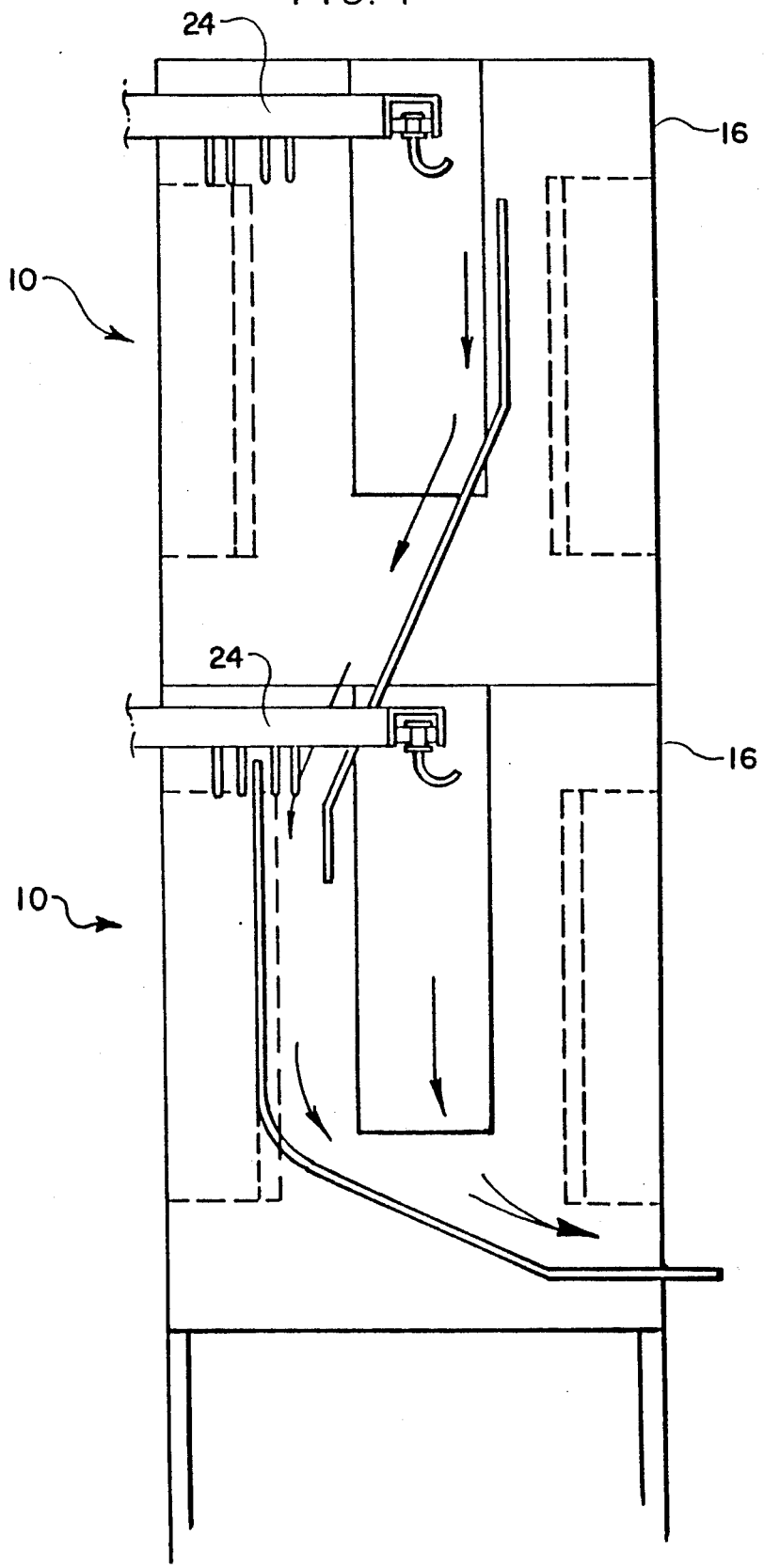
FIG. 7 is an end elevational view of an embodiment of the present invention wherein two of the cooking apparatus of FIG. 1 are arranged in stacked relation to one another.

The interior of the housing 16 is equipped with an exhaust hood formed by a pair of ceiling panels 56, 58 which extend angularly upwardly in converging relation from the lengthwise interior side walls of the housing 16 above the respective sets of heater panels 34,36 to a point of convergence directly above the lengthwise central area of the cooking chamber 18, as best seen in FIG. 3. The ceiling panel 56 is formed with a plurality of exhaust openings regularly spaced along its length immediately adjacent its intersection with the ceiling panel 58, each exhaust opening 60 communicating with a respective exhaust duct 62 which extends horizontally outwardly through the adjacent lengthwise side wall of the housing 16 and then upwardly therefrom for communication with suitable ducting or the like for exhaustion to the outside of the restaurant or other establishment in which the apparatus 10 is operated. Advantageously, this described exhaust arrangement, by providing for lateral exhaust of the cooking chamber 18 through the horizontally-extending ducts 60,62, enables the housing 16 of the cooking apparatus to be compactly configured of a rectangularly box-shape which, in turn, enables two or more of the housings 16 to be stacked in superposed relation to one another, as illustrated in FIG. 7, enabling the overall production capacity of the cooking apparatus to be essentially doubled without occupying additional floor space.

Preferably, the exhaust ducts 62 are not directly connected with a fan or other means of forced air movement. Instead, the converging configuration of the ceiling panels 56, 58 in conjunction with the exhaust ducts 62 creates a natural chimney effect to produce a continuous convective flow of air into the housing 16, upwardly through the cooking chamber 18, and outwardly through the exhaust openings and ducts 60,62. Preferably, the rate of air flow is no greater than is necessary to sufficiently exhaust any smoke, fumes and other airborne effluent released from the chickens 12 or otherwise generated during the cooking process and also to maintain a generally constant air temperature within the cooking chamber 18 so that all chickens 12 are uniformly cooked to the same degree without regard to the quantity of chickens being cooked or the frequency with which chickens are delivered into the cooking apparatus 10. This aspect of the present cooking apparatus and method is particularly important to the reliable operation of the apparatus 10 in a commercial restaurant setting. As will be understood, it will sometimes be necessary for a restaurant operator to utilize the cooking apparatus 10 for preparing only a relatively few chickens on a relatively infrequent basis during periods of slow customer patronage, but at other times to operate the cooking apparatus at its fullest capacity. It is therefore important to insure that the heating of air within the cooking chamber 18 has a minimal affect on the cooking process under both extremes, which the present apparatus and method achieved.

The interior of the housing 16 may also be provided with a collection trough 66 (FIG. 3) mounted to the end side walls of the housing 16 directly beneath the cooking chamber 18 for collecting grease and the like rendered from the chicken carcasses 12 during the cooking operation. The collection trough 66 is inclined slightly from one end of the housing 16 to the other to drain all such material into a suitable container (not shown) for disposal. Alternatively, the housing 16 may be equipped with removable drawers (not shown) slidably supported in the interior of the housing 16 beneath the cooking chamber 18 for collecting grease while also being removable for cleaning. It is contemplated that the drawers would be inclined to one side of the housing for drainage of collected grease to the outside of the housing 16. Advantageously, both collector embodiments enable the collection of substantially clear, clean chicken grease which can be utilized for other purposes, e.g. the production of cosmetics. The latter embodiment provides the additional advantages of ease of cleaning and maintenance of the cooking apparatus in a commercial restaurant setting.

Since in either case the grease collector is disposed below the heater panels 34,36, the collector is not directly heated by the panels 34,36 and accordingly remains relatively cool, thereby minimizing the production of smoke, fumes and the like when grease and like drippings from the chickens strike the collection trough 66. Thus, although as above-described it is desirable in the operation of the present cooking apparatus 10 to maintain a continuous exhaust air flow through the cooking chamber 18, the rate of such air flow will in all cases be substantially lower than is conventionally required in the operation of a commercial gas-fueled grilling apparatus.

In operation of the cooking apparatus 10, the time required for cooking chickens 12 and the degree to which the chickens are cooked are modulated by means of two basic adjustments in the apparatus 10. First, the pressure or rate at which gaseous fuel is supplied to the heater panels 34,36 may be adjusted through a suitable supply valve in the gas supply system (not shown), which enables the temperature to which chickens 12 are subjected in the cooking chamber 18 to be selectively increased and decreased. Secondly, the operational speed of the conveyor drive motor 32 may be adjusted to selectively increase and decrease the traveling speed of the conveyor 24 which, in turn, determines the cooking time, i.e., the time required for each chicken 12 to travel through the entirety of the cooking chamber 18 between its entrance and exit ends 20,22. Presently, it is considered preferable that these two variables be adjusted to accomplish cooking of each individual chicken 12 within a total cooking time of 20-25 minutes.

As is known, although chicken meat is relatively lean, chickens nevertheless characteristically have a concentration of fatty tissue directly beneath the skin in the region of the thighs and back, particularly where they connect with the breast. It has been discovered that, when the meat-side of a chicken in the opened generally flat condition hereinabove described is exposed directly to a radiant gas-fired burner of the type utilized in the present apparatus for a sufficient continuous period of time to accomplish cooking of the chicken meat, the skin of the chicken in this fatty region becomes severely burnt while the underlying meat does not cook as fully as the meat elsewhere in the chicken, all of which would necessarily make the cooked chicken unsuitable for restaurant sales. Presumably, this condition results from the greater content of fat underlying the chicken skin in the thigh and back region.

To prevent burning of the chicken skin in the fatty region and undercooking of the underlying meat, the present cooking apparatus 10 contemplates that chickens 12 are always to be mounted in the same orientation on the support forks 40 of the conveyor 24 so that the meat side of every chicken faces the same set of heater panels, e.g., the heater panels 34, and in conjunction therewith the present apparatus 10 provides means which selectively modifies the cooking energy of heat emitted from the region or area of each such heater panel 34 directly adjacent the fatty region of chickens 12 as they are transported in the afore-described suspended state through the cooking chamber 18, as generally indicated at 70 in FIGS. 3 and 4. In the preferred embodiment as illustrated, the cooking energy modifying means is in the form of a generally planar wire mesh screen 72 suspended from an elongate support rod 74 which is affixed at its opposite ends to the housing 16 at the lateral side of the entry and exit openings 20,22 adjacent the heater panels 34. The screen 72 is of a dimension in height substantially corresponding to the fatty region of the chickens 12 and is of a sufficient length to extend substantially the full length of the cooking chamber 18. In turn, the mounted disposition of the support rod 74 is selected to interpose the screen 72 directly horizontally between the fatty region of chickens 12 and the horizontally adjacent region of each heater panel 34.

In preliminary testing, it has been discovered that the screen 72 effectively prevents undesirable burning of the skin in the fatty region of chickens cooked in the apparatus 10 while also achieving a more thorough cooking of the underlying meat than is accomplished by the same apparatus without the screen 72. The particular reasons and manner in which the screen 72 accomplishes this result are unknown, but it is believed that the screen 72 acts generally in the nature of a filter to partially "filter" infrared rays emitted from the laterally adjacent regions of the heater panels 34. It is accordingly contemplated that other suitable web-like materials than the wire mesh screen 72 may operate equally well to achieve the described results.

It has also been discovered that the shoulder region of the chickens 12, i.e. the region whereat the wings adjoin the breast, sometimes does not cook as rapidly as the other meaty regions of the chickens. Accordingly, to promote thorough cooking of the shoulder region and prevent undercooking thereof, an upwardly angled metal reflector plate 68 is mounted alongside the lowermost margins of the heater panels 34,36 at each side of the cooking chamber 18 to reflect radiant heat energy emitted by the opposing heater panels 34,36 back toward the shoulder region of the chickens 12 to promote somewhat accelerated cooking of the chickens in such shoulder region.

The significant advantages and improvements of the present cooking apparatus 10 and the cooking method it performs may thus be understood. First, it is believed that the present cooking apparatus in its preferred embodiment as described and illustrated represents the first apparatus by which whole chickens can be broiled on a continuous automated conveyorized basis with sufficiently reliable protection against undesirable burning and sufficiently reliable cooking thoroughness to be commercially acceptable for operation in a restaurant, institutional or like setting. In comparison with conventional gas-fueled broiling grills of the type currently in widespread use for the commercial broiling of meats and other foods, the present cooking apparatus eliminates the need for constant manual attention to the cooking process by skilled personnel with equal if not greater consistency in the cooking quality, decreases the overall cooking time required, substantially reduces the smoke, fumes and other airborne effluent generated during the cooking process and, in turn, substantially reduces the air flow and filtering capacity of the associated exhaust system necessary for handling such effluent, all of which makes the present cooking apparatus and method substantially more energy and cost efficient to operate. As a result, differently seasoned and flavored meats and other foods of the same or different types may be boiled side-by-side without risk of cross-contamination of flavors due to the significant reduction of smoke, fumes and flames fueled by rendered grease and drippings characteristic of conventional gas-fueled grilling apparatus.

The present conveyor arrangement with its support forks makes the mounting of chickens on the conveyor simple and ease to accomplish and facilitate the automation of the cooking process by enabling whole chickens to be transported through the apparatus in the open generally flat condition as described, which heretofore has been utilized only when manually boiling chickens on a conventional gas-fueled grill. In conjunction therewith, the deflector plates of the discharge arrangement provide a simple yet reliable means for removing chicken from the forks of the conveyor arrangement without tearing or separation of the chicken carcass. Further, the staggered arrangement of the heater panels together with the provision of the reflector plates and the exhaust arrangement of the present apparatus cooperate to advantageously maintain the air temperature within the cooking chamber essentially constant without regard to the number and frequency at which chickens are delivered into the cooking chamber, whereby all chickens are substantially uniformly cooked whether the apparatus is being operated infrequently at minimal capacity or continuously at full capacity.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. Apparatus for cooking whole chicken carcasses each of which has been severed along its breast bone and opened into a generally flat condition wherein its internal chest and abdominal cavity forms one side of the chicken carcass and its breast, back, wings, thighs and legs form the opposite side of the chicken carcass, with each leg of each chicken carcass having a free end terminating at a knuckle which is relatively enlarged with respect to the adjacent portion of the leg, said apparatus comprising:

(a) means for generating cooking energy, said generating means having a pair of energy-emitting faces spaced from one another in generally upright laterally-opposed facing relation for defining therebetween a cooking area;

(b) endless conveyor means for transporting the whole chicken carcasses individually along a cooking path through said cooking area between said energy-emitting faces, said endless conveyor means having spaced therealong a plurality of support means each configured for suspending a whole chicken carcass by its legs with the legs sufficiently spread from each other to maintain the chicken carcass opened in said generally flat condition, each said support means comprising a pair of support members, each support member being configured for suspending one chicken leg therefrom, each support member being generally of a fork shape having a laterally-spaced pair of prongs for receiving and engaging therebetween the portion of a chicken leg adjacent its terminal end knuckle with the knuckle resting on the prongs, each said support means having its pair of support members sufficiently spaced from one another for cooperatively spreading the legs of the whole chicken carcass sufficiently from each other to maintain the chicken carcass opened in said generally flat condition, each spaced pair of support members comprising a leading support member and a trailing support member, said prongs of the leading support member of each spaced pair of support members extending outwardly from said conveyor means to a greater extent than said prongs of the trailing support member of each spaced pair of support members; and (c) means associated with said conveyor means at an exit end of said generating means for automatically removing each chicken carcass from the spaced pair of support members from which the chicken carcass is suspended, said removing means comprising means for deflecting each leg of each chicken carcass outwardly from the prongs of the support member from which the leg is suspended, said deflecting means being arranged for removing both legs of each chicken carcass simultaneously from the spaced pair of support members from which the chicken carcass is suspended, said deflecting means comprising a pair of deflector plates stationarily arranged adjacent said conveyor means at a spacing therealong corresponding to the spacing between a spaced pair of said support members, the first said deflector plate along the direction of travel of said conveyor means being arranged to deflect a chicken leg on each said leading support member only partially outwardly with respect to said prongs thereof and to deflect a chicken leg on each said trailing support member fully outwardly from said prongs thereof, the second said deflector plate along the direction of travel of said conveyor means being arranged to deflect a chicken leg on each said leading support member fully outwardly from said prongs thereof.

2. Apparatus for cooking whole chicken carcasses according to claim 1 and characterized further in that each said support member has a covering of material which resists sticking of chicken skin thereto during cooking.

3. Apparatus for cooking whole chicken carcasses according to claim 2 and characterized further in that said covering is selectively removable.

4. Apparatus for cooking whole chicken carcasses according to claim 3 and characterized further in that said covering is a sleeve of a stick-resistant plastic material.

* * * * *

UNITED STATES PATENT AND TRADEMARK OFFICE
CERTIFICATE OF CORRECTION

PATENT NO. : 5,176,068

DATED : January 5, 1993

INVENTOR(S) : Robert M. Stuck and Samuel H. Maw, Jr.

It is certified that error appears in the above-identified patent and that said Letters Patent is hereby corrected as shown below:

Column 3, line 44, delete "defector" and insert therefor -- deflector --

Column 7, line 16, delete "he" and insert therefor -- the --.

Column 8, line 12, delete "achieved" and insert therefor -- achieve --.

Column 8, line 32, delete "advantages" and insert therefor -- advantage --.

Column 10, line 29, delete "boiled" and insert therefor -- broiled --.

Column 10, line 36, delete "ease" and insert therefor -- easy --.

Column 10, line 36, delete "facilitate" and insert therefor -- facilitates --.

Column 10, line 40, delete "boiling" and insert therefor -- broiling --.

Signed and Sealed this

Thirtieth Day of November, 1993

Attest:

BRUCE LEHMAN

Attesting Officer

Commissioner of Patents and Trademarks